Patented Sept. 25, 1945

2,385,383

UNITED STATES PATENT OFFICE 2,385,383

PROCESS OF PREPARING MELAMINE RESIN AND PRODUCT THEREOF

Paul C. Schroy, Stamford, Conn., assignor to American Cyanamid Company, New York, N. Y., a corporation of Maine No Drawing. Application September 13, 1940, Serial No. 356,655

4 Claims. (Cl. 260—72)

This invention relates to melamine-formaldehyde resins which are soluble and/or colloidally dispersible in cold water.

Previous attempts to prepare melamine-formaldehyde resins which may be dissolved or dispersed in cold water to form concentrated solutions have not been successful. Products which are dispersible or soluble in cold water will generally not form highly concentrated solutions whereas those substances which do form highly concentrated solutions usually require hot water in order to dissolve them.

An object of this invention is to produce melamine-formaldehyde resins by an improved process.

Another object of the present invention is to provide melamine-formaldehyde resins which may be dispersed and/or dissolved in cold water in high concentrations.

Still another object of this invention is to provide concentrated melamine-formaldehyde resin solutions which may be diluted considerably without precipitation.

These and other objects are attained by reacting about 2½ mols to about 4 mols of formaldehyde with 1 mol melamine at a pH of about 6.3 (measured with bromthymol blue indicator) at a temperature of 50–90° C. and for about one-half hour, adjusting the pH to above 7, preferably between 8–8.5, vacuum concentrating at a temperature above the melting point of the fluid resin syrup to form a viscous, fusible resin which becomes brittle on cooling.

The following example in which the proportions are in parts by weight is given by way of illustration and not in limitation. The formalin used in the example is an aqueous solution containing 37% by weight of formaldehyde.

Example

| | Parts |
|---|---|
| Melamine (1 mol) | 126 |
| Formalin (3 mols) | 243 |

The pH of the mixture of these substances is adjusted to 6.3 as determined with bromthymol blue indicator (0.04%) in conjunction with a Hellige color disk, bromthymol blue D (No. 170–D). The mixture is heated up to about 80° C. over about one-half hour. The temperature is then allowed to drop to about 60° C., requiring about 10 minutes, and it is maintained at that temperature for one-half hour measured from the time that the mixture originally attained 60° C. After this time, the syrup is adjusted to a pH of about 8–8.5 and it is filtered to remove any insoluble impurities which may be present, thereby producing a clear hydrophilic resin syrup. The syrup is now concentrated by heating under a vacuum of about 9–10 inches of mercury absolute pressure, the vacuum being maintained at such a point that the temperature of the resinous syrup will be high enough to keep it fluid, i. e., above the melting point thereof. This temperature will vary from about 50° C. to a temperature slightly above 100° C., e. g., 105–115° C. as water is removed. When the resinous syrup has been substantially dehydrated, it is removed from the concentrating kettle and cooled to produce a substantially clear, solid resin which is ground to a fine white powder. This powder may be dissolved in cold water (water at about room temperature, e. g., around 30° C.) by agitation to produce concentrations of 50–60%. The concentrated solution thus produced may be diluted down to around 20% and in some instances as low as 10%. The powder may also be dissolved in aqueous media containing various proportions of water-miscible alcohols, e. g., ethanol.

Syrups made from my dispersible resin are quite stable at room temperature for periods of about 2 to 4 weeks or more. The stability of the syrups is not of particular importance since the dry powder may be stored at room temperature indefinitely and solutions thereof may be prepared just prior to use. Accordingly, my compositions have a great practical advantage over the syrups which have previously been used, most of which are stable for relatively short periods of time.

I have found that the conditions under which I prepare my dispersible melamine-formaldehyde resins are quite critical. If the pH during the reaction of the melamine-formaldehyde is too low a hydrophobic relatively insoluble resin generally results. On the other hand, if a high pH is used, crystalline compounds are usually obtained which will not dissolve in cold water to any substantial extent and which require boiling in order to get them into solution. Furthermore, such crystalline materials are generally soluble or dispersible only to the extent of about 20–33⅓%. Accordingly, the pH should be adjusted to about 6.3 as determined with bromthymol blue and Hellige disk No. 170–D as indicated by the above example. The pH of the reaction mixture should not be varied greatly. Reaction at pH 6.2 or 6.4 may be operative to a somewhat limited extent but the products obtained are not wholly comparable with those which are produced at the preferred pH of 6.3. The pH of the syrup during concentration is not particularly critical and therefore it may be determined with any convenient indicator such as bromthymol blue in the lower ranges or with phenol red in the higher ranges. Preferably the pH is between about 8 and 8.5 and it must be above 7.

The time of reaction which is measured from the time at which the reaction mixture reaches 60° C. to the time at which the mixture is adjusted to a pH of greater than 7 may be varied within relatively narrow limits to produce materials similar to that described in the above example but with slightly greater or slightly lower water solubility. The time of reaction may also affect the degree to which concentrated solutions of the product may be diluted without precipitating. It may be desirable to maintain the reaction mixture at elevated temperatures, e. g., 50-90° C. for much longer periods of time than one-half hour from the time the reaction mixture first reaches 60° C.

In some instances it may be desirable to heat the mixture of formalin and melamine up to about 90° C. or even up to the reflux point at about 92—94° C. until the melamine is all in solution and then to lower the temperature of the reaction to a temperature between 50 and 90° C. and preferably at about 60° C. The temperature should not be maintained at around 90° C. for any substantial length of time if a product having optimum properties is to be obtained. However, if temperatures near the upper limit of the reaction temperature range be used, i. e., around 90° C., the time of reaction should be shortened, whereas if temperatures close to the low limit of the range of reaction temperatures be used, the time of reaction may be slightly greater than one-half hour measured as indicated above.

The temperature employed during the vacuum concentration is also of some importance in obtaining compositions having optimum properties. This temperature should preferably be just high enough to keep the syrup in a molten condition. Obviously this temperature will rise as water is distilled off. The vacuum dehydration step is a heat treatment as well as a drying operation and it therefore affects the properties of the ultimate product. I have found that a medium vacuum should be used in order to keep the product fluid during the process and for this purpose an absolute pressure of about 9-10 inches of mercury is usually satisfactory. Slightly higher pressures may be used, i. e., low vacua, but the consequent higher temperature may cause undesired polymerization. On the other hand, extremely low pressures, i. e., high vacua, are not generally desirable since the temperature will then be too low to maintain the resin in a fluid condition and too low to provide proper heat treatment. Accordingly, the preferred range of temperatures as indicated by the preceding example is the most satisfactory in order to produce a product having the satisfactory properties desired and also one which may be ground and stored at room temperature without caking.

Minor proportions of other formaldehyde-reactive materials may be used in place of part of the melamine used in the above example, e. g., urea, thiourea, dicyandiamide, etc.

Obviously other aldehydes or substances which yield formaldehyde may be substituted for the formaldehyde used in the above example, e. g., trioxymethylene, paraformaldehyde, etc.

Various modifiers may be included in aqueous syrups prepared from my products, e. g., casein, albumen, the alginates, polyvinyl alcohol, starch, etc. Such modified syrups are of use in treating paper or cloth. Suitable plasticizers may also be added to syrups of my compositions, e. g., N-ethanol p-toluene sulfonamide, N-ethanol stearamide, etc.

My product, whether in its dry form or in solution, is useful in treating textiles and paper for finishing purposes, in laminating fabric and paper, in the manufacture of molding compounds, as an adhesive in the production of plywood, as a bonding agent for asbestos, ground cork and other fillers in the production of gaskets and the like, in lacquer, enamel, paint or other coating compositions, etc.

Obviously many modifications and variations in the processes and compositions described above may be made without departing from the spirit and scope of the invention as defined in the appended claims.

I claim:

1. A process which comprises reacting about 2½ to 4 mols of formaldehyde with 1 mol of melamine at a pH of about 6.2-6.4, at a temperature of 50-90° C. for about one-half hour, adjusting to a pH above 7, dehydrating with heat under a vacuum maintained so that the temperature is high enough to keep the resin fluid, cooling the resin when substantially dry and grinding the resulting product to a fine powder.

2. A process which comprises reacting about 2½ to 4 mols of formaldehyde with 1 mol of melamine at a pH of about 6.3, at a temperature of 50-90° C. for about one-half hour, adjusting to a pH above 7, dehydrating with heat under a vacuum maintained so that the temperature is high enough to keep the resin fluid, cooling the resin when substantially dry and grinding the resulting product to a fine powder.

3. A process which comprises reacting about 2½ to 4 mols of formaldehyde with 1 mol of melamine at a pH of about 6.3, at a temperature of 50-90° C. for about one-half hour, adjusting to a pH of about 8-8.5, dehydrating with heat under a vacuum maintained so that the temperature is high enough to keep the resin fluid, cooling the resin when substantially dry and grinding the resulting product to a fine powder.

4. A process which comprises heating about 3 mols of formaldehyde with 1 mol of melamine at a pH of about 6.3 until a homogeneous syrup is formed, allowing the temperature to drop to about 60° C., adjusting to a pH of about 8-8.5 one-half hour after the temperature first reaches about 60° C., dehydrating with heat under a vacuum maintained so that the temperature is high enough to keep the resin fluid, cooling the resin when substantially dry and grinding the resulting product to a fine powder.

PAUL C. SCHROY.